(12) United States Patent
Acs et al.

(10) Patent No.: US 8,002,888 B2
(45) Date of Patent: *Aug. 23, 2011

(54) PHENYLPYRAZOLONE COLORANT

(75) Inventors: Arpad Acs, Schwalbach (DE); Till Borchert, Darmstadt (DE); Ruediger Jung, Kelkheim (DE); Steffen Schneider, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 12/671,044

(22) PCT Filed: Feb. 12, 2008

(86) PCT No.: PCT/EP2008/001038
§ 371 (c)(1),
(2), (4) Date: Jan. 28, 2010

(87) PCT Pub. No.: WO2009/015698
PCT Pub. Date: Feb. 5, 2009

(65) Prior Publication Data
US 2010/0192801 A1 Aug. 5, 2010

(30) Foreign Application Priority Data
Aug. 1, 2007 (DE) .......... 10 2007 036 126

(51) Int. Cl.
C09B 67/20 (2006.01)
C09B 29/01 (2006.01)
C09B 29/50 (2006.01)
C09D 11/02 (2006.01)

(52) U.S. Cl. ........ 106/496; 8/662; 8/690; 47/57.6; 106/31.78; 106/31.79; 106/34; 106/272; 106/712; 430/7; 430/108.23; 524/190

(58) Field of Classification Search ........... 106/31.78, 106/31.79, 496, 34, 272, 712; 8/662, 690; 47/57.6; 430/7, 108.23; 524/190
See application file for complete search history.

(56) References Cited

U.S. PATENT DOCUMENTS

| | | | |
|---|---|---|---|
| 5,047,517 A * | 9/1991 | Deucker | 534/784 |
| 6,469,147 B2 | 10/2002 | Nickel et al. | |
| 6,504,045 B2 | 1/2003 | Jung et al. | |
| 6,602,342 B2 * | 8/2003 | Schmidt et al. | 106/498 |
| 7,135,266 B2 | 11/2006 | Baur et al. | |
| 7,309,389 B2 | 12/2007 | Baur et al. | |
| 7,419,541 B2 | 9/2008 | Grimm et al. | |
| 7,824,488 B2 * | 11/2010 | Borchert et al. | 106/494 |
| 2001/0029294 A1 | 10/2001 | Nickel et al. | |
| 2002/0077387 A1 | 6/2002 | Schmidt et al. | |
| 2003/0083410 A1 | 5/2003 | Baur et al. | |
| 2006/0228640 A1 | 10/2006 | Baur et al. | |

FOREIGN PATENT DOCUMENTS

| | | |
|---|---|---|
| EP | 0361431 | 4/1990 |
| EP | 1170338 | 1/2002 |
| EP | 1257602 | 11/2002 |
| WO | WO 01/25335 | 4/2001 |
| WO | WO 01/59013 | 8/2001 |
| WO | WO2008/101612 A1 * | 8/2008 |

OTHER PUBLICATIONS

PCT Search Report for PCT/EP 2008/001038, mailed Mar. 13, 2009.
PCT International Preliminary Report on Patentability for PCT/EP 2008/001038, mailed Oct. 16, 2009.
English Translation of the International Preliminary Report on Patentability for PCT/EP/2008/001038 Oct. 10, 2010.

* cited by examiner

*Primary Examiner* — Anthony J Green
(74) *Attorney, Agent, or Firm* — Anthony A. Bisulca

(57) ABSTRACT

The invention relates to a colorant of the formula (2) where M=Ca, Sr or a combination of Ca and Sr.

7 Claims, No Drawings

PHENYLPYRAZOLONE COLORANT

The present invention describes a novel yellow phenylpyrazolone colorant, processes for preparation thereof and use thereof in recording fluids, particularly for ink-jet printing, and also for applications in aqueous coating systems.

To obtain crisp high-definition prints, recording fluids and colorants present therein have to meet certain requirements with regard to lightfastness, waterfastness, purity, particle size, storage stability, viscosity, surface tension, conductivity, color strength, hue and brightness. The type of colorant used in the inks is very important because some requirements are mutually incompatible. Dyes are easy to incorporate into ink systems which then have high storage stability, low viscosity and high brightness, but dyes lead to poorer light- and waterfastness for the corresponding prints. Pigments, on the other hand, have good to very good light- and waterfastnesses, but exhibit only moderate brightness. In addition, pigments make it more difficult to produce a storage-stable dispersion and larger pigment particles can lead to nozzle blockages and deposits (kogation) in the print heads of recording machines or printers.

The following yellow colorants are mainly used at present in recording fluids: particularly C. I. Acid Yellow 23, C. I. Direct Yellow 132, C. I. Reactive Yellow 37 and C. I. Reactive Red 23 among dyes. For pigments, they are mainly C. I. Pigment Yellow 151, C. I. Pigment Yellow 155 and C. I. Pigment Yellow 180.

Of the phenylpyrazolone pigments of general formula (1)

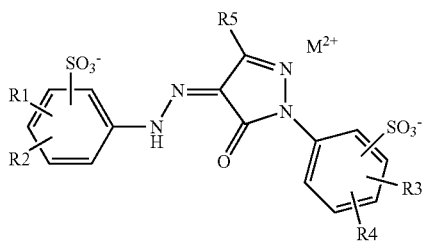

(1)

it is C. I. Pigment Yellow 100, C. I. Pigment Yellow 183 and C. I. Pigment Yellow 191 (EP-B-0 361 431) which are used industrially. However, the hue of these known pigments is in the reddish yellow region, which makes them less attractive for use in recording fluids.

There is a need for greenish yellow colorants which combine the good properties of dyes with the good properties of pigments and are generally recognized as safe by ecologists.

It has now been found that, surprisingly, the phenylpyrazolone described hereinbelow is suitable of meeting the requirements of colorants for recording fluids and of having a greenish yellow hue.

The present invention accordingly provides a colorant of formula (2)

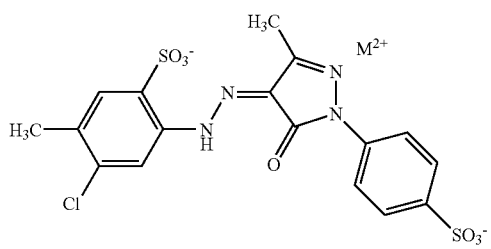

(2)

where M=Ca, Sr or a combination of Ca and Sr.

The compound of formula (2) can also be present in some other tautomeric and/or cis-trans-isomeric form and contain chloride ions, sodium ions and also water.

The colorant of the present invention is readily dispersible in aqueous media and is notable for a greenish yellow hue having good lightfastnesses, high transparency and low viscosity in the application medium.

The present invention also provides a process for preparing the compound of formula (2) by azo coupling the diazonium salt of 2-amino-4-chloro-5-methyl-benzene-1-sulfonic acid with 1-(4'-sulfophenyl)-3-methyl-5-pyrazolone and laking with a calcium salt, with a strontium salt or with a combination thereof.

The diazotization reaction is suitably carried out with alkali metal nitrites or the alkyl nitrites of short-chain alkanes, together with strong mineral acids. Sodium nitrite and hydrochloric acid are particularly suitable. The reaction can be carried out in a temperature range of −5° C. to +35° C., preferably between 0° C. and 10° C. Although not required, nonionic, anionic or cationic surface-active substances can be present in the diazotization. Further auxiliaries can also be used if desired, provided they do not jeopardize the advantages of the present invention.

Coupling is possible by the direct method or by the indirect method, but is preferably carried out directly, i.e., the diazonium salt is added to the initially charged coupling component. The coupling reaction can be carried out in a temperature range between −5° C. and 80° C., preferably between 10° C. and 50° C., and at a pH between pH 3 and 14, preferably between pH 5 and 8. The azo-coupling reaction is preferably carried out in aqueous solution or suspension, but it is also possible to use organic solvents, if desired mixed with water. In general, the coupling component is used in a small excess relative to the diazonium compound, and preferably 1 equivalent of diazo component is reacted with 1.001 to 1.10 equivalents of the coupling component.

To lake the azo compound thus produced, a suspension of the coupling product is admixed with a calcium salt, preferably a water-soluble calcium salt, for example calcium chloride, in the form of its aqueous solution, and/or with a strontium salt, preferably a water-soluble strontium salt, for example strontium chloride, in the form of its aqueous solution and subsequently stirred for some time; a slightly elevated temperature of 30 to 100° C. is generally sensible for completing the laking.

After laking, the colorant of the present invention is usually subjected to a heat treatment in an aqueous, aqueous-organic or organic medium at temperatures between 60° C. and 98° C., preferably between 60° C. and 85° C., if appropriate under superatmospheric pressure and for 0.1 to 4 hours.

Subsequently, the suspension obtained can be filtered in a conventional manner and the presscake washed salt-free with water and dried. Depending on the intended use, it can be sensible for the colorant of the present invention to be subjected to a mechanical operation to convert it into a fine state of subdivision. The conversion into a fine state of subdivision can be effected for example by wet or dry grinding or kneading.

It is possible to add customary pigmentary dispersants, surface-active agents, defoamers, extenders or other customary additives at any point of the process, provided they do not jeopardize the advantages of the present invention. It is also possible to use mixtures of these additives. Additives can be added all at once or in multiple portions. Additives can be added at every stage of the synthesis or of the various aftertreatments or after the aftertreatments. The best suitable time must be determined beforehand in range-finding tests.

It is also possible for one or more of the recited process steps for preparing the colorants of the present invention to be carried out in a microreactor as described in EP-A-1 257 602 for example. In this case, the heat treatment can also be distinctly shorter than one hour, for example in the range from 0.01 to 600 seconds.

The colorant of the present invention is suitable in principle for coloring emulsion and gloss paints that are water- and/or solvent-containing. They are further useful in the manufacture of printing inks or colors, for example textile printing colors, flexographic printing inks, decorative printing inks or colors or intaglio printing inks, wallpaper colors, water-thinnable coatings, wood protection systems, viscose spin dyeing, coatings, sausage casings, seed, fertilizers, glass, in particular glass bottles, roof tiles, color filters, electrophotographic toners and developers, renders, concrete, wood stains, colored pencil leads, felt tip pens, waxes, paraffins, graphics inks, pastes for ballpoint pens, crayons, washing and cleaning compositions, shoe care products, latex products and abrasives.

More particularly, the colorant of the present invention is useful in the manufacture of liquid printing inks for use in all conventional inkjet printers, particularly for those which are based on the bubble jet or piezo process. Inkjet inks can be aqueous based or solvent based, microemulsion inks, UV-curable inks and also hot-melt inks. These liquid printing inks can be used to print paper and also natural or synthetic fiber material, foils and plastics. In addition, the colorant of the present invention can be used for printing a wide variety of coated or uncoated substrate materials, for example paperboard, cardboard, wood and woodbase materials, metallic materials, semiconductor materials, ceramic materials, glasses, glass fibers, ceramic fibers, inorganic materials of construction, concrete, leather, food products, cosmetics, skin and hairs. The substrate material may be two-dimensionally planar or have spatial extent, i.e., be three-dimensional, and be printed or coated not only completely but also only partially.

The colorant of the present invention is also useful for color filters for flat panel displays, not only for additive but also subtractive color generation, further for photo resists and also as colorants for "electronic inks" (e-inks) or "electronic paper" (e-paper).

In the examples which follow, percentages and parts are by weight.

SYNTHESIS EXAMPLE 1

22.1 g (0.1 mol) of 2-amino-4-chloro-5-methylbenzene-1-sulfonic acid are introduced into 200 ml of water and dissolved with 9.1 ml of aqueous sodium hydroxide solution (33%) by heating, clarified and admixed with 25.0 ml of hydrochloric acid (31%). The suspension obtained is cooled to 15° C. and diazotized by addition of 13.3 ml of a 40% sodium nitrite solution.

To 400 ml of water and 11.1 ml of aqueous sodium hydroxide solution (33%) are added 25.4 g (0.1 mol) of 1-(4'-sulfophenyl)-3-methyl-5-pyrazolone and dissolved therein.

The suspension of the diazonium salt is gradually added to the warm solution of the coupling component at 40° C. while the pH is maintained in the range from 6.0 to 6.5 by addition of aqueous sodium hydroxide solution. After coupling has ended, the yellow suspension is heated to 80° C. and 33.3 g of calcium chloride are added. The suspension is subsequently stirred at 80° C. for 2 hours, filtered, and the filter residue is washed, dried at 120° C. and ground to obtain 41.6 g of a yellow powder.

SYNTHESIS EXAMPLE 2

22.1 g (0.1 mol) of 2-amino-4-chloro-5-methylbenzene-1-sulfonic acid are introduced into 200 ml of water and dissolved with 9.1 ml of aqueous sodium hydroxide solution (33%) by heating, clarified and admixed with 25.0 ml of hydrochloric acid (31%). The suspension obtained is cooled to 15° C. and diazotized by addition of 13.3 ml of a 40% sodium nitrite solution.

To 400 ml of water and 11.1 ml of aqueous sodium hydroxide solution (33%) are added 25.4 g (0.1 mol) of 1-(4'-sulfophenyl)-3-methyl-5-pyrazolone and dissolved therein.

The suspension of the diazonium salt is gradually added to the warm solution of the coupling component at 40° C. while the pH is maintained in the range from 6.0 to 6.5 by addition of aqueous sodium hydroxide solution. After coupling has ended, the yellow suspension is heated to 80° C. and 53.3 g of strontium chloride are added. The suspension is subsequently stirred at 80° C. for 2 hours, filtered, and the filter residue is washed, dried at 120° C. and ground to obtain 52 g of a yellow powder.

USE EXAMPLE 1

1000 parts of a grind mixture consisting of 565 parts of ethylene glycol, 198 parts of ion-free water, 75 parts of Igepal® CO-630, 127 parts of Geropon® WS-251, 32 parts of Tamol® 731A and 3 parts of Byk®-019 Defoamer are initially charged to a plastics beaker and admixed with 100 parts of colorant powder from synthesis example 1. 1500 parts of glass beads are added. The mixture is dispersed in a disperser at 600 rpm for 45 min. The millbase is separated from the glass beads by the filter system.

500 parts of the millbase are stirred with 1125 parts of ion-free water and 875 parts of Viacryl® SC 175 W/40 in a plastics beaker until homogeneous, and the homogeneous mixture is drawn down on a test card.

A greenish yellow varnish of high transparency is obtained.

USE EXAMPLE 2

200 parts of the aqueous acrylic varnish of use example 1 are mixed with 50 parts of ethylene glycol, 100 parts of diethylene glycol, 50 parts of 2-pyrrolidone, 10 parts of butanol, 2 parts of Nipacide® IB, 10 parts of triethanolamine and 578 parts of ion-free water to form an aqueous ink.

This ink is transferred into the appropriate empty cartridge of an inkjet printer (Canon i560). This is followed by uniform printing over several pages.

A nonstreaky greenish yellow print of high contour crispness is obtained.

We claim:
1. A colorant of formula (2)

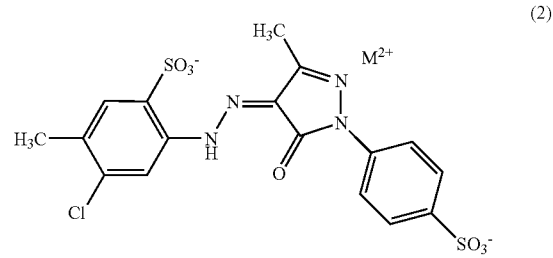

wherein M=Ca, Sr or a combination of Ca and Sr.

2. The process for preparing the colorant of claim 1 comprising the steps of azo coupling a diazonium salt of 2-amino-4-chloro-5-methylbenzene-1-sulfonic acid with 1-(4'-sulfophenyl)-4-methyl-5-pyrazolone and laking with a calcium salt, with a strontium salt or with a combination thereof.

3. The process as claimed in claim 2, wherein the colorant is subjected to a heat treatment in an aqueous, aqueous-organic or organic medium at temperatures between 60° C. and 98° C.

4. The process as claimed in claim 2, wherein the colorant is subjected to a mechanical operation to convert it into a fine state of subdivision.

5. A colored article or composition comprising a colorant as claimed in claim 1, wherein the colored article or composition is printing inks, wallpaper colors, water-thinnable coatings, wood protection systems, viscose, coatings, sausage casings, seed, fertilizers, glass, roof tiles, color filters, electrophotographic toners, electrophotographic developers, renders, concrete, wood stains, colored pencil leads, felt tip pens, waxes, paraffins, graphics inks, pastes for ballpoint pens, crayons, washing compositions, cleaning compositions, shoe care products, latex products or abrasives.

6. A process for the production of a liquid printing ink for use in ink-jet printers comprising adding a colorant as claimed in claim 1 to the liquid printing ink during the manufacture of the liquid printing ink.

7. A liquid printing ink for use in ink jet printers made in accordance with the process of claim 6.

\* \* \* \* \*